United States Patent
Erickson et al.

(10) Patent No.: US 11,512,667 B2
(45) Date of Patent: Nov. 29, 2022

(54) ANTI-UNSTART FOR COMBINED CYCLE HIGH MACH VEHICLES

(71) Applicant: Rolls-Royce North American Technologies Inc., Indianapolis, IN (US)

(72) Inventors: Kaare P. Erickson, Fishers, IN (US); Michael A. Karam, Plainfield, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 458 days.

(21) Appl. No.: 16/284,552

(22) Filed: Feb. 25, 2019

(65) Prior Publication Data
US 2020/0271074 A1   Aug. 27, 2020

(51) Int. Cl.
*F02K 7/16* (2006.01)
*F02K 7/14* (2006.01)
*F02K 3/075* (2006.01)
*F02K 3/077* (2006.01)

(52) U.S. Cl.
CPC ............... *F02K 7/16* (2013.01); *F02K 3/075* (2013.01); *F02K 3/077* (2013.01); *F02K 7/14* (2013.01); *F05D 2220/74* (2013.01)

(58) Field of Classification Search
CPC . F02K 3/075; F02K 3/077; F02K 7/14; F02K 7/16
See application file for complete search history.

(56) References Cited

U.S. PATENT DOCUMENTS

| | | | |
|---|---|---|---|
| 3,417,767 A | 12/1968 | Young | |
| 3,777,488 A * | 12/1973 | Gross | F02K 7/16 60/204 |
| 3,879,941 A | 4/1975 | Sargisson | |
| 4,043,121 A | 8/1977 | Thomas et al. | |
| 4,054,030 A | 10/1977 | Pedersen | |
| 4,064,692 A * | 12/1977 | Johnson | F02K 3/075 60/762 |
| 4,175,384 A | 11/1979 | Wagenknecht et al. | |
| 4,185,457 A | 1/1980 | Parker et al. | |
| 4,523,517 A | 6/1985 | Cronin | |
| 5,094,070 A * | 3/1992 | Enderle | F02K 1/1215 60/224 |

(Continued)

FOREIGN PATENT DOCUMENTS

| | | |
|---|---|---|
| DE | 3824468 A1 | 1/1990 |
| GB | 900662 | 7/1962 |
| GB | 914124 | 12/1962 |

OTHER PUBLICATIONS

Scott R. Thomas, "TBCC Technical Challenge Overview", NASA Glenn Research Center, Cleveland, Ohio, Mar. 13-15, 2012, pp. 1-21. (Year: 2012).*

(Continued)

*Primary Examiner* — Lorne E Meade
(74) *Attorney, Agent, or Firm* — Barnes & Thornburg LLP

(57) ABSTRACT

Vehicles, such as aircraft, may include turbine-based combined cycle power plants (TBCC) for power to achieve high-mach speeds. An anti-unstart configuration provides control for transitioning between the amount of air directed to either engine during operation of gas turbine engine and scramjet engines, to avoid unstart during operation above sonic speeds.

19 Claims, 3 Drawing Sheets

(56) References Cited

U.S. PATENT DOCUMENTS

| | | | |
|---|---|---|---|
| 5,261,227 A * | 11/1993 | Giffin, III | F02K 3/077 60/226.1 |
| 5,680,754 A | 10/1997 | Giffin et al. | |
| 5,694,768 A | 12/1997 | Johnson et al. | |
| 5,918,472 A | 7/1999 | Jonqueres | |
| 7,246,484 B2 * | 7/2007 | Giffin, III | F02K 3/072 60/268 |
| 8,007,229 B2 | 8/2011 | McCaffrey et al. | |
| 8,292,217 B2 * | 10/2012 | Smith | G06F 30/15 244/53 B |
| 8,701,379 B2 | 4/2014 | Bulman | |
| 8,961,114 B2 | 2/2015 | Ruthemeyer | |
| 9,057,328 B2 | 6/2015 | Kupratis | |
| 9,188,083 B2 * | 11/2015 | Kupratis | F02C 3/107 |
| 9,279,388 B2 | 3/2016 | Kupratis | |
| 9,714,608 B2 | 7/2017 | Sokhey et al. | |
| 9,765,700 B2 | 9/2017 | Mackin et al. | |
| 9,850,822 B2 | 12/2017 | Kurpratis | |
| 2008/0128547 A1 * | 6/2008 | Pederson | F02K 7/14 244/55 |
| 2013/0149100 A1 | 6/2013 | Lawlor et al. | |
| 2015/0275762 A1 | 10/2015 | Kenyon et al. | |
| 2016/0096629 A1 | 4/2016 | Vaisman | |
| 2016/0153362 A1 | 6/2016 | Sanchez | |
| 2016/0201608 A1 | 7/2016 | Kupratis | |

OTHER PUBLICATIONS

Foster et al., "Highlights from a Mach 4 Experimental Demonstration or Inlet Mode Transition for Turbine-Based Combined Cycle Hypersonic Propulsion", 48th AIAA/ASME/SAE/ASEE Joint Propulsion Conference & Exhibit, Atlanta, Georgia, Jul. 30-Aug. 1, 2012, pp. 1-15. (Year: 2012).*

Dustin et al., "Continuous-output Terminal Shock-Position Sensor for Mixed-Compression Inlets Evaluated in Wind-tunnel Tests of YF-12 Aircraft Inlet", NASA-TM-X-3144, National Aeronautics and Space Administration, Washington D.C., 1974, pp. 1-23. (Year: 1974).*

* cited by examiner

ANTI-UNSTART FOR COMBINED CYCLE HIGH MACH VEHICLES

BACKGROUND

The present disclosure relates generally to vehicles adapted for travelling at high speed, and more specifically to vehicles adapted for travelling at speeds near the speed of sound up to significantly beyond the speed of sound.

High-Mach aerospace vehicles may have distinctive system arrangements to achieve efficient operation at near sonic speeds and above. For example, a turbine based combined cycle propulsion arrangement may include a gas turbine engine operating in parallel with a scramjet engine. Each engine has distinct operational needs, and during multimode propulsion, balancing those operational needs can implicate complex and potentially catastrophic issues. For example, engine unstart must be carefully avoided during transition between the amount and/or profile of thrust provided by either engine.

SUMMARY

The present disclosure may comprise one or more of the following features and combinations thereof.

According to an aspect of the present disclosure, a turbine-based combined cycle (TBCC) propulsion system for an aerospace vehicle may include a flow passageway including a common inlet section for receiving air from the environment, a pair of propulsion segments each connected with the common inlet section, and a common exhaust section connected with each of the propulsion segments for discharging exhaust products. The common inlet section may include an apportionment control flap for guiding apportioned air to the propulsion segments. The propulsion system may include combined cycle power assembly including a gas turbine engine and a scramjet engine, each positioned in one of the propulsion segments to receive apportioned air from the common inlet section. The gas turbine engine may include at least two fan stages for providing apportioned air to each of a core flow and a third stream. The gas turbine engine may include a variable guide vane arranged between the at least two fan stages and adapted for adjustable positioning to direct an amount of the apportioned air of the gas turbine engine to the third stream. The propulsion system may include an anti-unstart control system for rapidly shedding apportioned air from the gas turbine engine while maintaining gas turbine operating conditions. The anti-unstart control system may include a processor adapted to execute instructions stored on a memory device and to communicate control commands to an actuator of the variable guide vane to adjust the position of the variable guide vane. The anti-unstart control system may determine the desired position of the guide vane based on a position of terminal shock along the flow passageway during operation above sonic speeds to prevent unstart.

In some embodiments, the gas turbine engine may include a primary exhaust nozzle positionable between retracted and extended positions to adjust the area of exhaust flow. The anti-unstart control system may determine the desired position of the primary exhaust nozzle based on the position of terminal shock along the flow passageway during operation above sonic speeds to prevent unstart. The gas turbine engine may include a third flow exhaust nozzle positionable between retracted and extended positions to adjust the area of third flow exhaust.

In some embodiments, the anti-unstart control system may determine the desired position of the third flow exhaust nozzle based on the position of terminal shock along the flow passageway during operation above sonic speeds to prevent unstart. The anti-unstart control system may be configured to adjust the position of the guide vane based on the position of terminal shock along the flow passageway during operation above sonic speeds to accommodate rapidly shedding apportioned air to the scramjet engine while maintaining operation of the gas turbine engine and preventing unstart. In some embodiments, accommodating rapidly shedding apportioned air to the scramjet engine may include accommodating adjustment of the apportionment control flap to direct a portion of the apportioned air to the scramjet engine. Accommodating rapidly shedding apportioned air may include reducing the apportioned air to the gas turbine engine from 100% to 50%.

In some embodiments, the gas turbine engine may include at least one of a primary exhaust nozzle and a third flow exhaust nozzle. The anti-unstart control system may be configured to adjust the position of the at least one of the primary exhaust nozzle and the third flow exhaust nozzle in collaboration with adjust of the position of the guide vane based on the position of terminal shock along the flow passageway during operation above sonic speeds to prevent unstart. In some embodiments, preventing unstart may include rapidly shedding apportioned air while maintaining gas turbine operation.

In some embodiments, the position of the terminal shock may be determined based on a prediction of terminal shock behavior according to pressure upstream of the gas turbine engine. The anti-unstart control system may determine the position of the terminal shock based on pressure within an inlet of the gas turbine engine upstream of the fan assembly.

According to another aspect of the present disclosure, a gas turbine engine adapted for use in a combined cycle (TBCC) propulsion system for during operation above sonic speeds of an aerospace vehicle may include a core assembly including a compressor for compressing air, a combustor for receiving compressed air from the compressor for combustion together with fuel to create exhaust flow for providing thrust, and a turbine for expanding exhaust flow from the combustor to drive rotation of the compressor, the compressor, combustor, and turbine collectively defining a core flow passage, and a third flow passage communicating from upstream of the compressor to downstream of the turbine for providing additional thrust; a fan assembly for providing air to the core flow passage and the third stream passage under drive rotation from the turbine, the fan assembly including at least two fan stages; and an anti-unstart control assembly. The anti-unstart control assembly may include a variable guide vane arranged between the at least two fan stages and adapted for adjustable positioning to direct an amount of the air from the upstream fan stage into the third flow passage for rapidly shedding air from the gas turbine engine while maintaining gas turbine operating conditions. The anti-unstart control assembly may include an anti-unstart control system including a processor adapted to execute instructions stored on a memory device and to communicate control commands to an actuator of the variable guide vane to adjust the position of the variable guide vane, wherein the anti-unstart control system determines the desired position of the guide vane based on a position of terminal shock to prevent unstart during operation above sonic speeds.

In some embodiments, the anti-unstart control assembly may include a primary exhaust nozzle positionable between retracted and extended positions to adjust the profile of exhaust flow from the core flow passage.

The anti-unstart control system may determined the desired position of the primary exhaust nozzle based on the position of terminal shock to prevent unstart during operation above sonic speeds. In some embodiments, the anti-unstart control assembly may include a third flow exhaust nozzle positionable between retracted and extended positions to adjust the profile of third flow exhaust from the third flow passage.

In some embodiments, the anti-unstart control system may determine the desired position of the third flow exhaust nozzle based on the position of terminal shock to prevent unstart during operation above sonic speeds.

The anti-unstart control system may be configured to adjust the position guide vane based on the position of terminal shock during operation above sonic speeds to accommodate rapidly shedding air from the gas turbine engine while maintaining operation of the gas turbine engine and preventing unstart. In some embodiments, accommodating rapidly shedding air from the gas turbine engine may include accommodating adjustment of the flow of air to the fan assembly. Accommodating rapidly shedding air may include reducing the flow of air to the fan assembly from 100% to 50%.

In some embodiments, the anti-unstart control assembly may include at least one of a primary exhaust nozzle and a third flow exhaust nozzle. The anti-unstart control system may be configured to adjust the position of the at least one of the primary exhaust nozzle and the third flow exhaust nozzle in collaboration with adjustment of the position of the guide vane based on the position of terminal shock to prevent unstart during operation above sonic speeds. In some embodiments, preventing unstart may include rapidly shedding air while maintaining gas turbine operation.

In some embodiments, the anti-unstart control system may determine the position of the terminal shock based on pressure upstream of the fan assembly.

These and other features of the present disclosure will become more apparent from the following description of the illustrative embodiments.

DETAILED DESCRIPTION OF THE DRAWINGS

Figure 1:
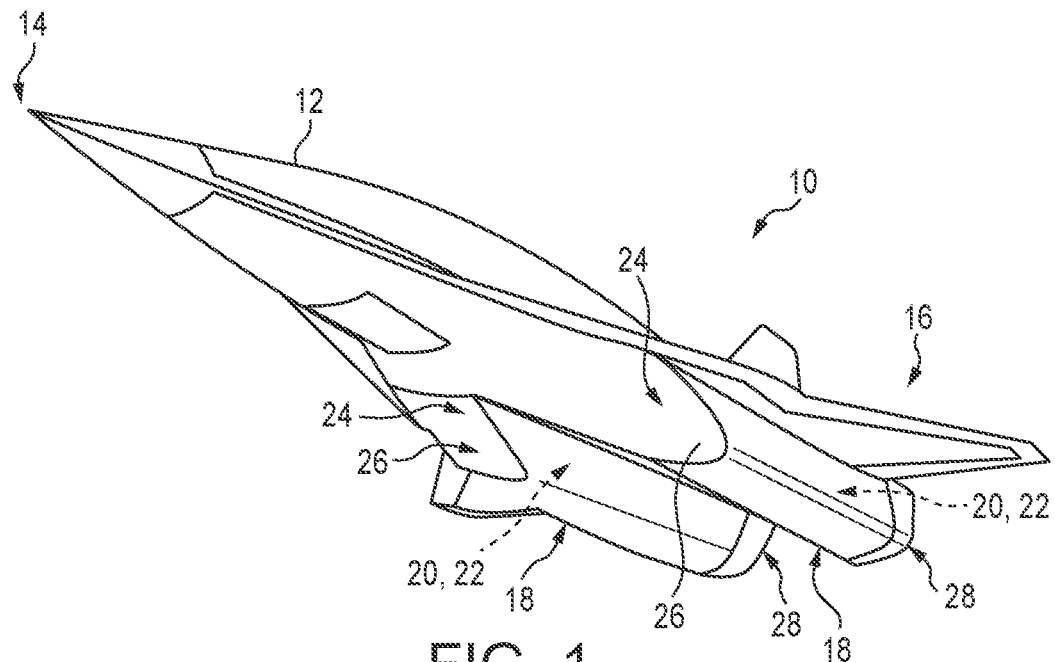
FIG. 1 is an perspective view of a high-Mach aircraft having a nose end and tail end and including a pair of turbine-based combined cycle power plants (TBCC) for providing thrust to the aircraft, each TBCC is arranged underwing within an outer nacelle and each TBCC includes an inlet for receiving ambient air into the TBCC for combustion and an exhaust for discharging exhaust products.

For the purposes of promoting an understanding of the principles of the disclosure, reference will now be made to a number of illustrative embodiments illustrated in the drawings and specific language will be used to describe the same.

Aerospace vehicles, such as aircraft, capable of near sonic, supersonic, and/or hypersonic speeds can endure environmental factors and/or phenomenon distinct from lower speed travel. Examples of such high-Mach vehicles may include the SR-71 Blackbird as marketed by Lockheed Martin of Bethesda, Md. The dynamics of air flow at such speeds can create distinct challenges. Across a range of speeds beyond the speed of sound, the dynamics can change dramatically, for example, lower supersonic speeds (e.g., Mach 1) may incur different design considerations than supersonic and/or hypersonic speeds (e.g., Mach 2.5, 3.0+).

Of course, in order to reach higher speeds, such as Mach 2.5 and above, the vehicle must first accelerate through the lower speeds, and therefore must be capable of operation throughout a range of speeds above the speed of sound. Yet, the dynamics at various speeds above the speed of sound can vary, creating challenges to desirable and/or efficient operation.

One example of the technical challenges evolving from the variations in supersonic operation can be experienced in turbine-based combined cycle (TBCC) propulsion systems. Turbine-based combined cycle propulsion includes a gas turbine engine arranged in parallel with a scramjet engine to provide thrust. The scramjet engine generally operates by allowing the high vehicle speed to provide the compression for combustion. Typically, the gas turbine engine is operated to ramp the vehicle speeds up to supersonic levels for scramjet operation. Yet, dual operation and/or transition between the extent of operation of each of the gas turbine engine and scramjet engine can incur challenges.

For example, engine unstart is a phenomenon which can be described as a violent breakdown of the supersonic airflow. Engine unstart can occur when the mass flowrate of air forced into the gas turbine engine changes rapidly, for example, when the flowrate exceeds the capacity of the gas turbine engine to handle flow in a given configuration. Engine unstart can produce hazardous and/or catastrophic issues due to dramatic changes in the forces on the vehicle and its engine. For example, the position of the terminal shock, also known as the normal shock, can be abruptly moved on engine unstart, sometimes referred to as "jumping" or "spitting out" of the terminal shock. Managing the risks of engine unstart can improve supersonic operation by reducing the risk of damage and/or improving stable operation.

As shown in FIG. 1, an illustrative high-Mach vehicle is shown as aircraft 10 including a body 12 (fuselage) having nose end 14 and tail end 16. The aircraft 10 illustratively includes a pair of power plants, embodied as turbine-based combined cycle power plants (TBCC) 18, secured with the body 12 within an outer nacelle in an underwing arrangement. The TBCC 18 are adapted to provide thrust and may also be adapted to provide electrical power and/or mechanical power to the aircraft 10.

As discussed in additional detail below, each TBCC 18 includes a pair of engines 20, 22 for powering the aircraft 10. In the illustrative embodiment, each TBCC 18 includes a flow passageway 24 in communication with the engines 20, 22 to provide ambient air for combustion. The flow passageway 24 includes the inlet 26 for receiving ambient air from the environment for use in the engines 20, 22, and an exhaust 28 for discharging exhaust flow including products of combustion from the engines 20, 22.

Figure 2:
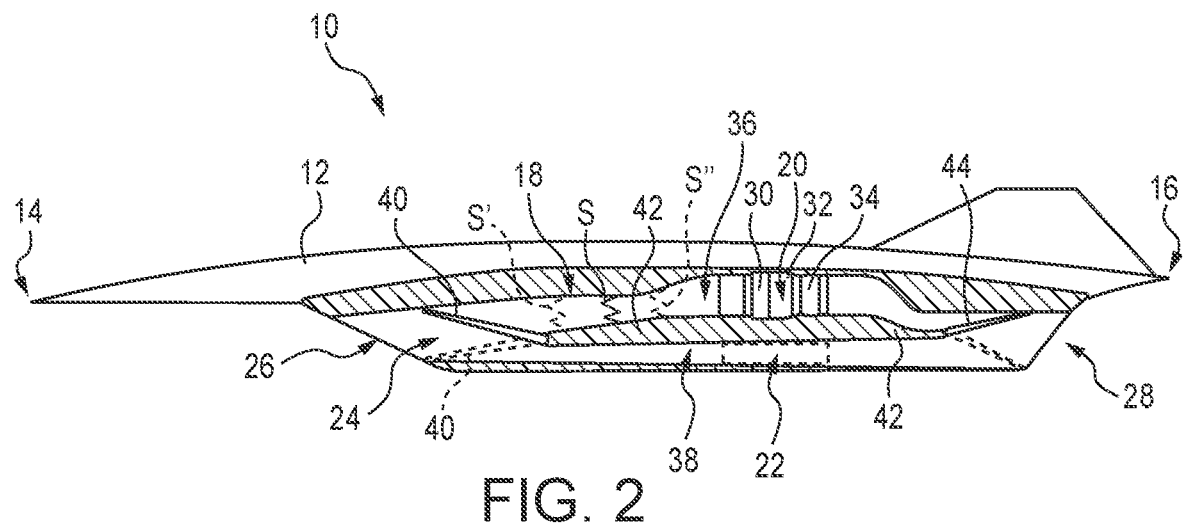
FIG. 2 is a cross-sectional view of one of the turbine-based combined cycle power plants (TBCC) along the nose to tail dimension showing that the TBCC includes a passageway with a gas turbine engine and a scramjet engine.

As shown in the illustrative embodiment of FIG. 2, the cross-section of the engine nacelle reveals the arrangement of the engines 20, 22 of the TBCC 18. Engine 20 is illustratively embodied as a gas turbine engine having compressor 30, combustor 32, and turbine sections 34 arranged to compress air, combust a mixture of air and fuel, and expand exhaust from the combustion to produce mechanical power including thrust and rotational force to the compressor (about axis 15 in FIG. 3). One example of a suitable gas turbine engine can include a turbofan engine such as the AE3007 as marketed by Rolls-Royce Corporation of Indianapolis, Ind. The engine 22 is illustratively embodied as a scramjet engine, and namely a dual-mode scramjet engine which includes both a ramjet mode and a scramjet mode, but in some embodiments, a ramjet or single-mode scramjet engine or other airbreathing engine may be applied.

Ramjet and a scramjet engines are both considered similarly functioning airbreathing jet engines which use the velocity of incoming air to provide compression. For purposes of this description, a ramjet engine (and/or ramjet mode of a dual-mode engine) may decelerate the velocity of air into the combustion zone to subsonic levels before combustion, while a scramjet (or scramjet mode of a dual-mode engine) may maintain supersonic air speed throughout the engine. Thus, for purposes of description the term "scramjet" or "scramjet engine" includes ramjet operation and/or single mode ramjet arrangements, unless indicated as "scram-jet specific engine" or ramjet specific engine," respectively. In a simplified example, unlike the gas turbine engine 20 which includes a compressor to actively compress incoming air for combustion, the scramjet engine 22 generally relies on the speed of the aircraft to provide compression of incoming air. Additionally, because no compressor is required for compression, scramjet engines can omit the turbine section which drives the compressor in a gas turbine engine. However, the scramjet engine 22 is incapable and/or undesirable for operation below relatively high speeds because sufficient compression is unavailable.

Thus, in the TBCC arrangement, the gas turbine engine 20 is operated to provide power at vehicle speeds (and thus air speeds) below the suitable and/or desirable range for operation of the scramjet engine 22. Yet, the scramjet engine 22 is adapted for high efficiency operation at speeds beyond the efficient use of the gas turbine engine 20, for example, above Mach 2.5, and even at speed beyond the capability of the gas turbine engine 20, for example, above Mach 4. Under configurations in which the scramjet engine 22 is available to meet all thrust needs for the aircraft 10 (e.g., high-mach speeds), the gas turbine engine 20 can be effectively shutdown, referred to as cocooned, into a ready-to-start but non-operational mode. As previously mentioned, in certain speed bands, a transition operation may exist in which both the gas turbine engine 20 and the scramjet engine 22 operate to provide thrust between low and high Mach speeds of aircraft operation. In some embodiments, the engines 20, 22 may include other individual or complimentary modes of operation (e.g., standby). Accordingly, with the TBCC arrangement, the gas turbine engine 20 can provide propulsion up to speeds at which the scramjet engine 22 can operate to reach speeds several times the speed of sound. This can be particularly useful in high altitude flight.

Referring to FIG. 2, the engines 20, 22 are commonly connected with the inlet 26 of the passageway 24 for receiving ambient air. Downstream from the inlet 26, the passageway 24 illustratively includes a turbine section 36 having the gas turbine engine 20 and a scramjet section 38 having the scramjet engine 22. The scramjet section 38 is illustratively formed to aerodynamically direct the incoming air for compression and combustion along with fuel within the scramjet engine 22. In some embodiments, the scramjet section 38 may have aerodynamic shape to reduce the speed of incoming air to cause compression for combustion together with fuel within the scramjet engine 22. A divider wall 42 illustratively separates the flow passageway 24 into turbine and scramjet sections 36, 38.

The location of terminal shock S is represented in FIG. 2, within the turbine section 36 of the passageway 24. As mentioned above, changes in the conditions of flow can shift the position of the terminal shock S, for example, flow rate changes throughout the course of operation at sonic, supersonic, and/or hypersonic speeds. By way of example, the location of the terminal shock may shift forward to position S' or aftward to position S". For purposes of description, the forward position S' is embodied as an example of a terminal shock location relative to at least one of the inlet 26 and turbine engine 20, which would indicate catastrophic engine unstart conditions. However, the actual location of terminal shock in engine unstart conditions may vary with respect to the flow passageway 24.

Figure 3:
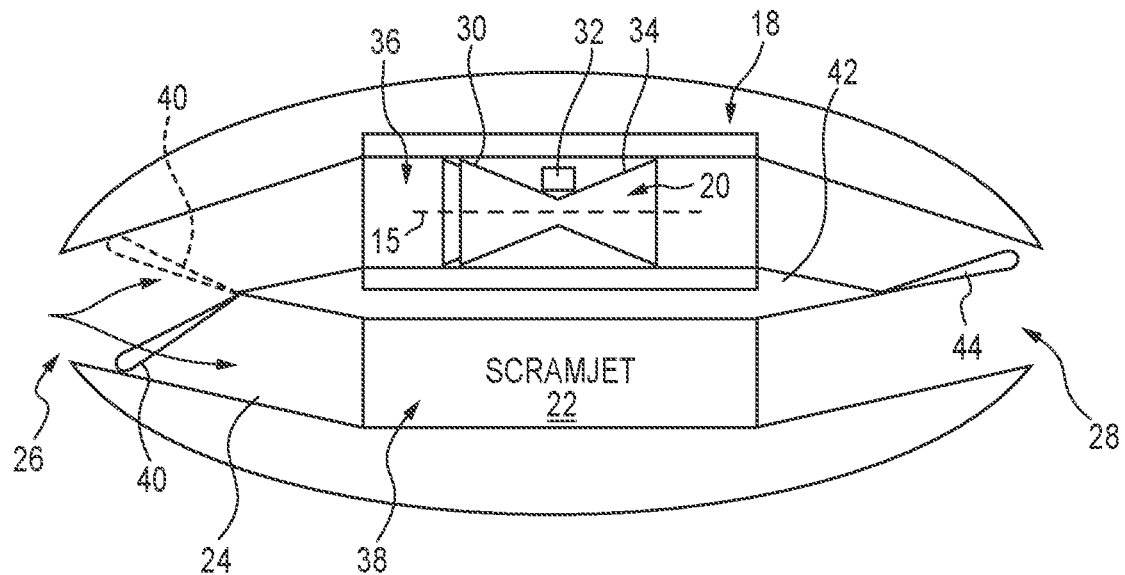
FIG. 3 is a diagrammatic cross-sectional view of the cross-sectional view of FIG. 2.

As shown in FIG. 3, a flow control member 40 is illustratively arranged upstream of the turbine and scramjet sections 36, 38 of the passageway 24 for directing the flow of ambient air. The flow control member 40 is embodied as a control flap positionable between a turbine position (as shown in dashed line in FIG. 3) and a scramjet position (as shown in solid line in FIG. 3) to apportion flow of ambient air from the inlet 26 between the sections 36, 38. The flow control member 40 is adapted as a control valve to selectively direct flow of ambient air from the inlet 26 through the turbine section 36 for use in the gas turbine engine 20 in the turbine position, and in the scramjet position to direct flow of ambient air from the inlet 26 through the scramjet section 38 for use in the scramjet engine 22. In intermediate positions, the flow control member 40 can divide flow between the turbine and scramjet engines 20, 22. In the illustrative embodiment, the flow control member 40 is operable between the turbine position providing 100% of flow from the inlet 26 to the gas turbine engine 20 and scramjet position providing 100% of flow from the inlet 26 to the scramjet, and intermediate positions to apportion any amounts from 0-100% between the two engines 20,22.

The flow control member 40 is illustratively positionable by hydraulic actuator, but in some embodiments, may be electrically, manually, pneumatically and/or otherwise suitably actuated. An optional exhaust flow control member 44 may be arranged downstream of the engines 20, 22, positionable in correspondence to the position of the flow control member 40 to assist in directing flow. As previously mentioned, air entering either of the engines 20, 22 is used with fuel for combustion to produce thrust by the expanding exhaust products. The exhaust products are dispelled through the exhaust 28.

The flow control member 40 is illustratively mounted on the divider wall 42 for pivoting between the turbine and scramjet positions. In some embodiments, the flow control member 40 may have any suitable arrangement for selective flow guidance, for example, may be mounted to the inner of outer walls of the passageway 24 and selectively positionable to block and/or divide flow between the engines 20, 22. The flow control member 40 is illustratively operated between its positions by an actuator via a control system accordingly to operational conditions. In some embodiments, an adjustable exhaust control member 44 may be arranged in the exhaust 28 for coordinated apportionment together with the flow control member 40.

Figure 4:
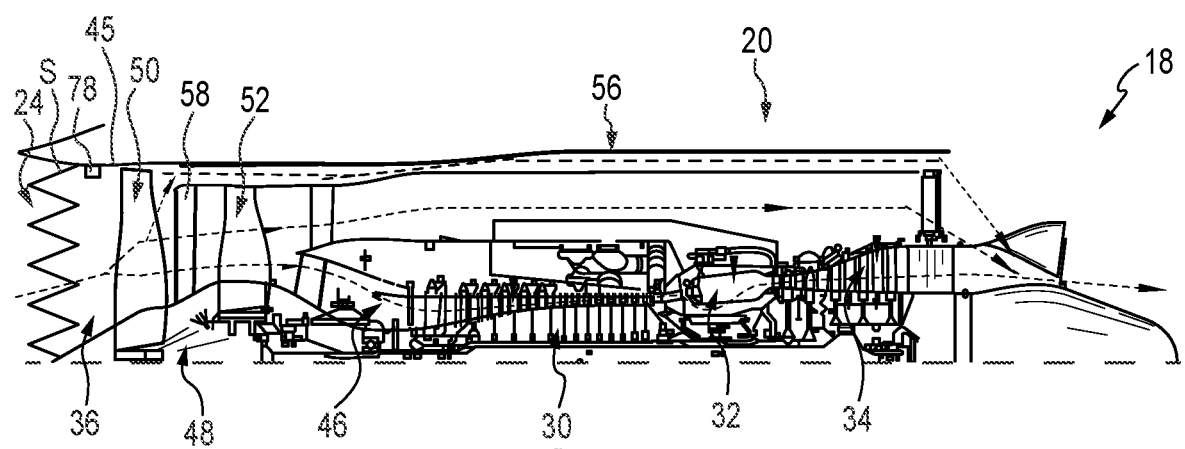
FIG. 4 is a partial cross-sectional view of the turbine of FIG. 2 showing that the turbine includes a core flow passage and a third flow passage, and an adjustable guide vane arranged between first and second fan stages to direct a portion of air into the third flow passage.

Referring now to the illustrative embodiment of FIG. 4, a cross-section of the turbine engine 20 reveals that the turbine engine 20 includes a core flow passage 46 defined collectively by the compressor 30, combustor 32, and turbine 34 sections as the primary flow path for combustion. The turbine engine 20 includes a fan assembly 48 arranged forward of the compressor 30 to provide air to the engine 20. The fan assembly 48 includes a first stage fan 50 and second stage fan 52 each coupled to receive rotational drive from the turbine section 34. The first stage fan 50 illustratively provide a first pressure of air to the second stage fan 52 for providing additional pressure of air to the engine 20. In the illustrative embodiment, the fans 50, 52 each receive rotational drive from the same low pressure portion of the turbine section 34 and have different airfoil blade configurations to provide their appropriate air pressures, however, in some embodiments, the fans 50,52 may each receive rotation drive from different low pressure portions of the turbine section 32. In some embodiments, additional fan stages may be included.

The turbine engine 20 includes a third flow passage 56 extending from the fan assembly 48 to the exhaust 28 to communicate third flow air from the fan assembly 48. The third flow passage 56 can provide third flow air from the first stage fan 50 to provide additional thrust from the engine 20 by adjusting the profile (area) of exhaust flow. The flowrate of air into the third flow passage 56 is governed by an adjustable guide vane 58.

The guide vane 58 is arranged between the first and second stage fans 50,52. The guide vane 58 is adjustable in position to direct different amounts of air into the third flow passageway 56. In the illustrative embodiment, the guide vane 58 is an airfoil shaped member extending radially from inner to outer surfaces defined by portions of the turbine section 36. The guide vane 58 is adjustable in angular position along its longitudinal (axial) extent to direct adjustable amounts of air from the first stage fan 50 into the third flow passage 56. In the illustrative embodiment, the guide vane 58 is controllable between retracted and extended positions to provide 0%-30% diverted air flow, respectively, into the third flow passageway 56, however, in some embodiments, the guide vane 58 may be controllable for any suitable range of flow into the third passage, including but without limitation, 0-100% of flow.

By adjusting the guide vane 58 position, the variability of the flow conditions which can lead to engine unstart conditions can be managed while maintaining suitable turbine engine 20 operating conditions. For example, during transition between thrust provided solely by turbine engine 20 to thrust provided by the scramjet engine 22, the available air flow rate from the inlet 26 is divided between the engines 20, 22. As the scramjet 22 is ramped up in operational extent, the amount of air to the scramjet 22 is increased and the amount of air to the turbine engine 20 is decreased. While ramping up speeds within the supersonic and/or hypersonic range, the turbine engine 20 can be required to quickly shed large amounts of flow to be provided to the scramjet engine 22. These air shedding events can be particularly challenging for suitable gas turbine operation and to avoid engine unstart conditions.

For example, if approaching Mach 2.5, the turbine engine 20 were required to suddenly (within a few seconds), shed 50% of its air flow received from the inlet 26, the turbine engine 20 could fail to have suitable operational flow. More specifically, the engine 20 may not be able to ramp down its air flow, with suitable operation, quickly enough to meet the needs of the scramjet engine 22. Yet, to handle this air shedding events, the operation of the third flow passage 56 to communicate portions of the air flow to the exhaust for thrust can mitigate the negative effects of sudden air shedding on the turbine engine 20. By way of example, the flow through third flow passage 56 can be increased on approaching a shedding event such as a particular stage of high Mach transition (e.g., Mach 2.5 to 2.8), and on occurrence of the shedding event the guide vane 58 can be adjusted to decrease air diverted to the third flow passage 56 thereby increasing the available flow to the core passage 46 during the shedding event. The appropriate management of the third flow air as dictated by the guide vane 58 can be based on the position of the terminal shock to avoid engine unstart conditions. Accordingly, adjusting the guide vane 58 based on the terminal shock position can assist in rapidly shedding air from the turbine 20 while maintaining suitable operating conditions for the turbine engine 20.

Figure 5:
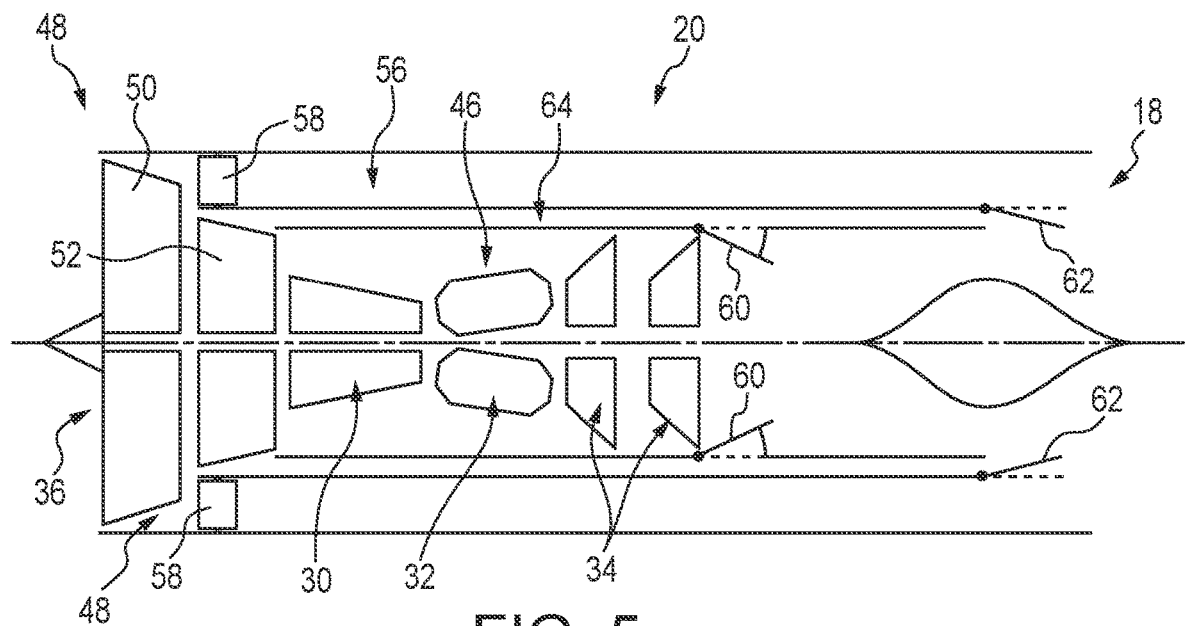
FIG. 5 is a diagrammatic view of the cross-sectional view of the turbine of FIG. 4.

Referring to FIG. 5, the guide vane 58 position can be determined based on the terminal shock position and in collaboration with other flow control devices, e.g., the guide vane 58 position can be positioned according to the terminal shock position, in collaboration with any of the flow control member 40, exhaust flow control member 44, the primary nozzle 60, and/or third flow nozzle 62. For example, the guide vane 58 can be positioned according to the terminal shock position, in collaboration with a primary exhaust nozzle 60. The primary exhaust nozzle 60 is illustratively embodied as a number of circumferentially arranged control flaps positionable between retracted (dashed line, FIG. 5) and extended positions (solid line, FIG. 5). The primary exhaust nozzle 60 can constrict/expand the exhaust flow path from the turbine section 36 and admit turbine bypass flow from a bypass passage 64, which communicates bypass flow from the second stage fan 52 to the exhaust 28, to adjust the profile of the exhaust from the core flow passage 46 through the exhaust 28. In some embodiments, bypass flow may be separately controlled relative to the primary nozzle 60.

The guide vane 58 can be positioned according to the terminal shock position, in collaboration with a third flow exhaust nozzle 62. The third flow exhaust nozzle 62 is illustratively embodied as a number of circumferentially arranged control flaps positionable between retracted (dashed line, FIG. 5) and extended positions (solid line, FIG. 5). The third flow exhaust nozzle 62 can constrict/expand the exhaust flow path from the turbine section 36 and configure the third flow air to provide thrust from the third flow passage 56 and/or to adjust the profile of the exhaust from the core flow passage 46 through the exhaust 28. As shown in FIG. 5, the guide vane 58 is arranged in an alternative position within the third flow passage 56, still between the first and second fan stages 50,52, although the collaborative control of the primary and/or third flow exhaust nozzles applies equally to the arrangement of the guide vane 58 as in FIG. 4. Although the nozzles are described as flaps in the illustrative embodiments, in some embodiments nozzles may be formed by any suitable manner including but without limitation, by axially actuated ramp nozzles.

Figure 6:
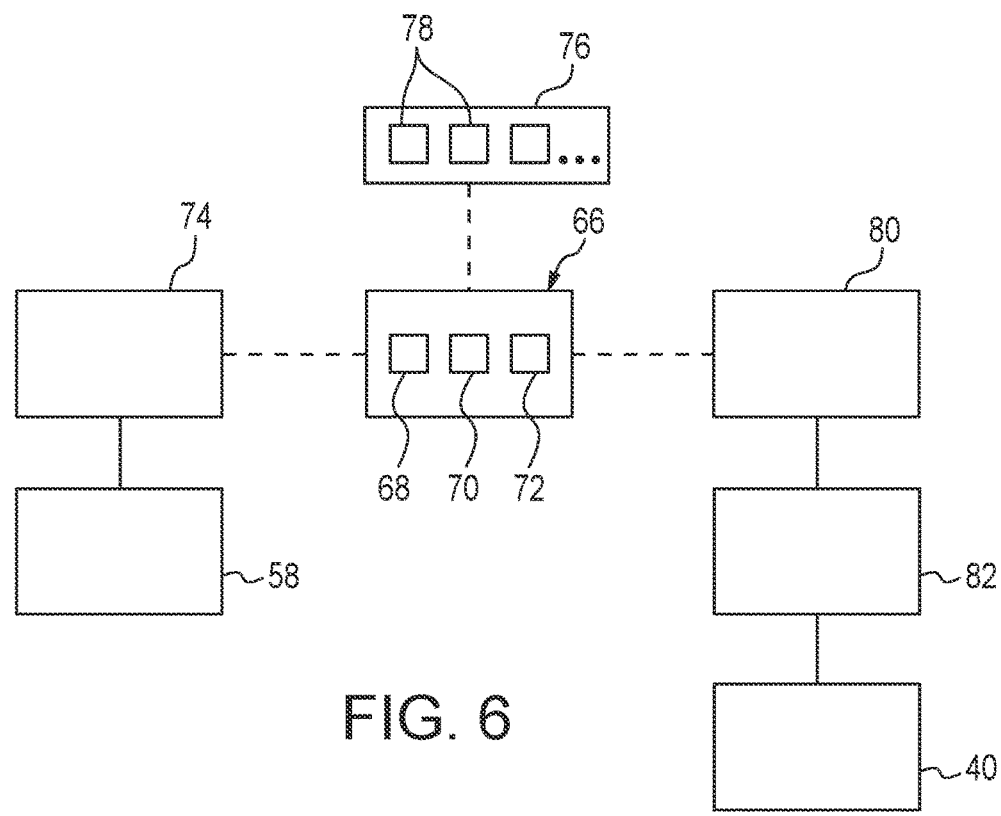
FIG. 6 is a diagram of a control system for providing anti-unstart control of the guide vane.

As show in FIG. 6, a control system 66 is illustrated for controlling the position of the guide vane 58. The control system 66 is arranged for determining and executing the positioning of the guide vane 58 for rapidly shedding apportioned air from the gas turbine engine 20 while maintaining gas turbine operating conditions. The control system 66 includes a processor 68 for executing instructions stored on a memory device 70, and communications circuitry 72 for enabling communications to and from the control system 66. The control system 66 is illustratively arranged in communication with the guide vane 58 via an actuator 74, illustratively embodied as a hydraulic actuator for positioning the guide vane 58.

Referring to FIG. 6, the control system 66 is illustratively arranged in communication with a sensor system 76 for determining the position of terminal shock. The sensor system 76 includes one or more sensors 78 arranged to sense conditions pertaining to terminal shock position of the TBCC 18. In the illustrative embodiment, each sensor 78 is embodied as a pressure sensor adapted to sense the pressure within the flow passage 24. The sensor 78 is illustratively arranged within the turbine section 36 of the flow passage 24 forward of the fan assembly 48 in an inlet 45 of the gas turbine engine 20 to detect the pressure near the expected position of terminal shock at speeds near and/or beyond sonic. In the illustrative embodiment, the sensors 78 include pressure sensors positioned in the flow passageway 24, but in some embodiments, the sensors 78 may include flow sensors, vibration sensors, temperature sensors, humidity sensors, and/or other sensors adapted to providing an indication of terminal shock position. In some embodiments, the sensor system 76 may include sensors 78 positioned within the scramjet section 38 of the flow passageway. The control system 66 receives indication of conditions sensed by the sensors 78 and determines the position of terminal shock based on the conditions indicated by the sensors 78. In some embodiments, the sensors 78 may be arranged within the passageway 24, between the common inlet 26 and the control member 40, and/or between the control member 40 and the engines 20, 22.

The control system 66 determines the appropriate position of the guide vane 58 based on the determined position of terminal shock for the TBCC 18. As previously mentioned, the position of the guide vane 58 can be determined in collaboration with other control elements, by the control system 66 and/or together with other controllers 80. The control system 66 is illustratively configured to determine the appropriate position of the guide vane 58 based on the position of terminal shock during supersonic and/or hypersonic travel to avoid engine unstart.

The position of terminal shock as determined by the control system 66 illustratively includes a present determination of terminal shock position. In some embodiments, the control system 66 may determine the position of terminal shock as a prediction of terminal shock positions throughout a range of speeds near or above sonic levels, based on the conditions indicated by the sensor system 76. For example, the control system 66 may determine a terminal shock position profile as range of positions expected for speeds from about Mach 1 to about Mach 2, and may determine a further terminal shock position profile for speeds from about Mach 2 to about Mach 2.5, and may determine still further determine further terminal shock position profiles for other speed ranges, such as Mach 3 and above. Accordingly, the control system 66 determines the position of the guide vane 58 based on the position of terminal shock to avoid unstart conditions for operation at a range of high speeds.

In the illustrative embodiment, the control system 66 is embodied as a distinct control operator in communication with one or more primary TBCC and/or aerospace vehicle controllers 80. The primary controller 80 are arranged in communication with the control member 40 via actuator 82 to adjust the position of the control member 40, but in some embodiments, control of the control member 40 may be provided by the control system 66. In some embodiments, the control system 66 may include partly and/or wholly shared components with the one or more primary TBCC and/or aerospace vehicle controllers 80, and/or may be wholly formed as part of the primary TBCC and/or aerospace vehicle controllers 80.

Although examples provided within the present disclosure include reducing third flow air to provide additional core passage flow in response to air shedding events, the control of the guide vane 58 in collaboration with various other control elements may include a wide variety of operational changes, including adjusting the guide vane 58 in a manner which would normally increase the rate of third flow air while adjusting various other control elements (e.g., the flow control member 40, exhaust flow control member 44, the primary nozzle 60, and/or third flow nozzle 62) accordingly. Additionally, the required positioning of the guide vane 58 may change throughout the range of operational speeds of the aircraft and the particular sequence of collaborative control of the various control elements may change accordingly. Moreover, the sequence and/or coordination of control elements during acceleration may vary from their sequence and/or coordination during deceleration.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine-based combined cycle (TBCC) propulsion system for an aerospace vehicle, the system comprising
   a flow passageway including a common inlet section for receiving air from the environment, a pair of propulsion segments each connected with the common inlet section, and a common exhaust section connected with each of the propulsion segments for discharging exhaust products, wherein the common inlet section includes an apportionment control flap for guiding apportioned air to the propulsion segments;
   a combined cycle power assembly including a gas turbine engine and a scramjet engine, each positioned in one of the propulsion segments to receive apportioned air from the common inlet section, the gas turbine engine including at least two fan stages for providing apportioned air to each of a core flow and a third stream, the gas turbine engine including a variable guide vane arranged between the at least two fan stages and adapted for adjustable positioning to direct an amount of the apportioned air of the gas turbine engine to the third stream; and
   an anti-unstart control system for rapidly shedding the apportioned air from the gas turbine engine while maintaining gas turbine operating conditions, the anti-unstart control system including a processor programmed to communicate control commands to an actuator of the variable guide vane to adjust the position of the variable guide vane during operation above sonic speeds,
wherein the processor is programmed to:
command the actuator of the variable guide vane to adjust the position of the variable guide vane to increase the third stream flow through a third flow passage in response to the TBCC traveling at a first speed above a predetermined speed threshold,
command the apportionment control flap to direct a portion of the apportioned air to the scramjet engine causing the rapidly shedding of the apportioned air from the gas turbine engine while the TBCC travels at a second speed greater than the first speed, and
command the actuator of the variable guide vane to adjust the position of the variable guide vane to decrease flow through the third flow passage in response to the apportionment control flap directing the portion of the apportioned air to the scramjet engine causing the rapidly shedding of the apportioned air from the gas turbine engine.

2. The TBCC propulsion system of claim 1, wherein the gas turbine engine includes a primary exhaust nozzle positionable between retracted and extended positions to adjust the area of exhaust flow.

3. The TBCC propulsion system of claim 2, wherein the primary exhaust nozzle is positionable by the anti-unstart control system during operation above sonic speeds.

4. The TBCC propulsion system of claim 3, wherein the gas turbine engine includes a third flow exhaust nozzle positionable between retracted and extended positions to adjust the area of third flow exhaust.

5. The TBCC propulsion system of claim 4, wherein the third flow exhaust nozzle is positionable by the anti-unstart control system during operation above sonic speeds.

6. The TBCC propulsion system of claim 1, wherein commanding the apportionment control flap to direct a portion of the apportioned air to the scramjet engine includes reducing the apportioned air to the gas turbine engine from 100% to 50%.

7. The TBCC propulsion system of claim 1, wherein the gas turbine engine includes at least one of a primary exhaust nozzle and a third flow exhaust nozzle, and the anti-unstart control system is configured to adjust the position of the at least one of the primary exhaust nozzle and the third flow exhaust nozzle in collaboration with the position of the guide vane during operation above sonic speeds.

8. The TBCC propulsion system of claim 1, further comprising a sensor configured to measure the pressure upstream of the gas turbine engine, and wherein a position of a terminal shock is determined based on a prediction of terminal shock behavior according to pressure upstream of the gas turbine engine.

9. The TBCC propulsion system of claim 1, wherein the anti-unstart control system determines the position of a terminal shock based on pressure within the common inlet of the gas turbine engine upstream of a fan assembly.

10. The TBCC propulsion system of claim 1, wherein the predetermined speed threshold is between about Mach 2.5 and Mach 2.8.

11. The TBCC propulsion system of claim 1, wherein the apportionment control flap is movable between a first position in which the apportionment control flap blocks the apportioned air from being directed to the gas turbine engine, a second position in which the apportionment control flap blocks the apportioned air from being directed to the scramjet engine, and a plurality of intermediate positions in which the apportionment control flap directs a first portion of air to the gas turbine engine and a second portion of air to the scramjet engine.

12. A gas turbine engine adapted for use in a turbine-based combined cycle (TBCC) propulsion system for use during operation above sonic speeds of an aerospace vehicle, the gas turbine engine system comprising:
a core assembly including a compressor for compressing air, a combustor for receiving compressed air from the compressor for combustion together with fuel to create exhaust flow for providing thrust, and a turbine for expanding exhaust flow from the combustor to drive rotation of the compressor, the compressor, combustor, and turbine collectively defining a core flow passage, and a third flow passage communicating from upstream of the compressor to downstream of the turbine for providing additional thrust;
a fan assembly for providing air to the core flow passage and the third flow passage under drive rotation from the turbine, the fan assembly including at least two fan stages; and
an anti-unstart control assembly including a variable guide vane arranged between the at least two fan stages and adapted for adjustable positioning to direct an amount of the air from the fan stage upstream of the variable guide vane into the third flow passage for maintaining gas turbine operating conditions when air flow to the fan assembly is rapidly shed from the gas turbine engine, and an anti-unstart control system including a processor programmed to communicate control commands to an actuator of the variable guide vane to adjust the position of the variable guide vane, during operation above sonic speeds,
wherein the processor is programmed to:
command the actuator of the variable guide vane to adjust the position of the variable guide vane to provide a first flow through the third flow passage in response to the core assembly traveling at a first speed above a predetermined speed threshold, and
command the actuator of the variable guide vane to adjust the position of the variable guide vane to provide a second flow that is less than the first flow through the third flow passage in response to a reduction in the flow of air to the fan assembly from 100% to 50% and the core assembly traveling at a second speed greater than the first speed.

13. The gas turbine engine of claim 1, wherein the anti-unstart control assembly includes a primary exhaust nozzle positionable between retracted and extended positions to adjust the profile of exhaust flow from the core flow passage.

14. The gas turbine engine of claim 13, wherein the anti-unstart control system adjusts a position of the primary exhaust nozzle during operation above sonic speeds.

15. The gas turbine engine of claim 12, wherein the anti-unstart control assembly includes a third flow exhaust nozzle positionable between retracted and extended positions to adjust the profile of third flow exhaust from the third flow passage.

16. The gas turbine engine of claim 15, wherein the anti-unstart control system adjusts a position of the third flow exhaust nozzle during operation above sonic speeds.

17. The gas turbine engine of claim 12, wherein the anti-unstart control assembly includes at least one of a primary exhaust nozzle and a third flow exhaust nozzle, and the anti-unstart control system is configured to adjust the position of the at least one of the primary exhaust nozzle and the third flow exhaust nozzle in collaboration with adjustment of the position of the variable guide vane during operation above sonic speeds.

18. The gas turbine engine of claim 12, further comprising a sensor configured to measure the pressure upstream of the gas turbine engine, and wherein the anti-unstart control system determines the position of a terminal shock based on pressure upstream of the fan assembly.

19. The gas turbine engine of claim 12, wherein the predetermined speed threshold is between about Mach 2.5 and Mach 2.8.

\* \* \* \* \*